May 8, 1945.　　C. J. KILDUFF　　2,375,304
STATIC ELIMINATOR
Filed Oct. 19, 1943
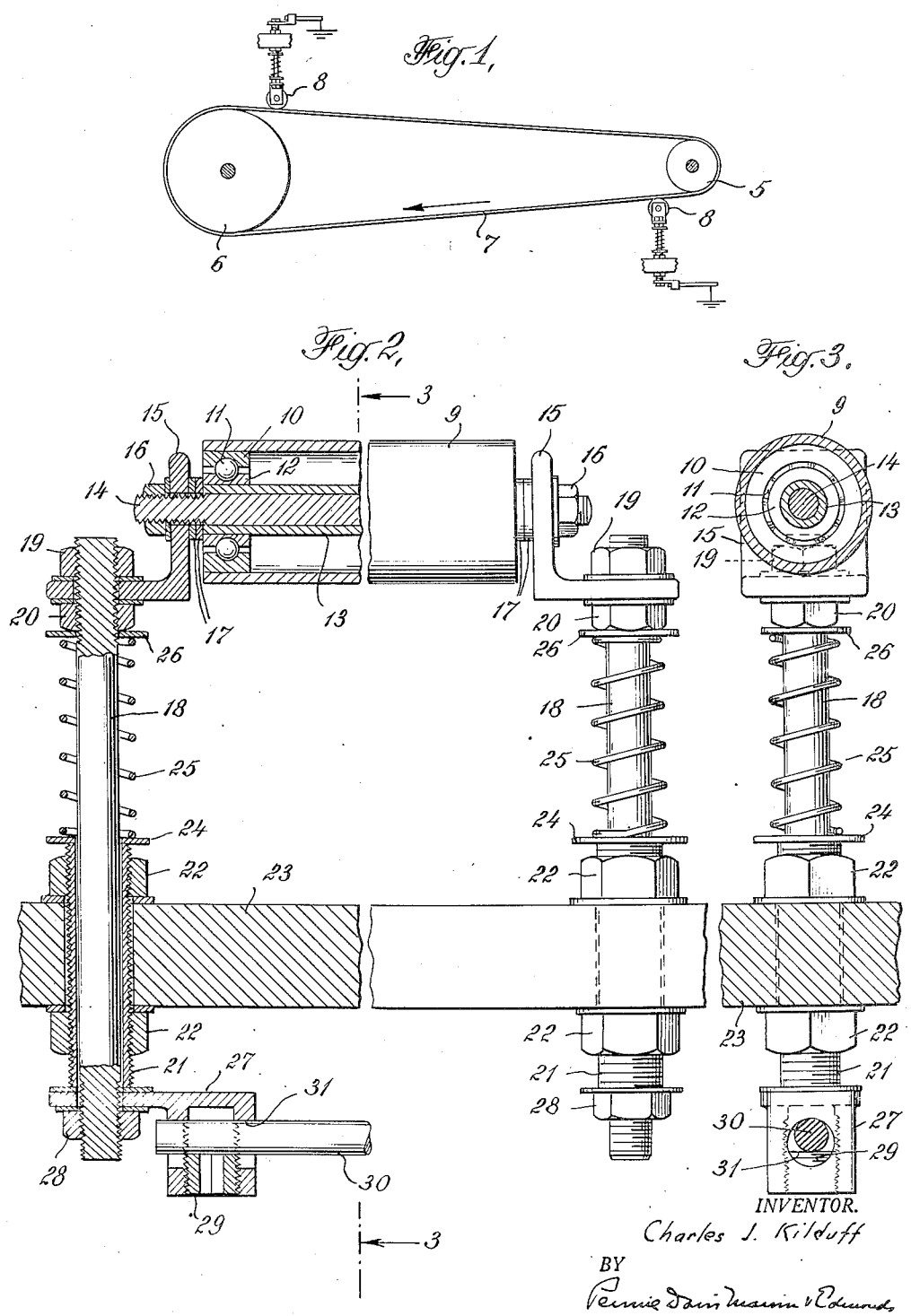
INVENTOR.
Charles J. Kilduff
BY
ATTORNEYS.

Patented May 8, 1945

2,375,304

UNITED STATES PATENT OFFICE 2,375,304

STATIC ELIMINATOR

Charles J. Kilduff, Baltimore, Md., assignor to U. S. Industrial Chemicals, Inc., New York, N. Y., a corporation of Delaware Application October 19, 1943, Serial No. 506,831

2 Claims. (Cl. 175—264)

This invention relates to static eliminators and particularly to a device for withdrawing static electrical charges from power transmission belts.

It is well known that power transmission belts generate electrical charges as they leave the pulleys over which they pass. Unless withdrawn, such charges build up and eventually discharge as sparks. In many industrial plants where combustible gases or dusts may be mingled with the atmosphere, a single spark may result in a serious explosion. Attempts have been made heretofore to remove the static electricity continuously from the moving belt. The devices heretofore suggested include brushes or combs which engage the belt and are connected to the ground. Such devices cause serious wear in the belt if adjusted to remove the electrical charge. Moreover, experience has shown that the known devices do not completely eliminate sparking and consequently the danger of igniting combustible mixtures in the surrounding atmosphere.

It is the object of the present invention to provide a simple and effective device which may be mounted for engagement with a moving belt at appropriate locations to remove static without danger of sparking and without causing any wear on the moving belt.

Other objects and advantages of the invention will be apparent and better understood by reference to the following specification and the accompanying drawing, in which Fig. 1 is a diagrammatic illustration of the application of the device to a power transmission belt;

Fig. 2 is an elevation partially in section of the device; and

Fig. 3 is a section on the line 3—3 of Fig. 2.

Referring to the drawing, 5 and 6 indicate pulleys over which a belt 7 travels in the direction indicated by the arrow. Static charges are produced in the belt at or adjacent the points at which it leaves the pulleys, and the static eliminators 8 are mounted to engage the belt at such points.

In accordance with the present invention, the static eliminator comprises a cylinder 9 of steel or other suitable metal which is adapted to engage the belt. The cylinder carries ball races 10 engaged by ball bearings 11 which are supported in ball races 12 secured to a tubular member 13. As will be readily understood, the structure of the ball bearings may vary, and roller bearings or other suitable means for eliminating friction may be employed.

The member 13 is secured to a bolt 14 extending through angle brackets 15 and held by nuts 16. Spacing washers 17 may be employed to ensure free rolling movement of the cylinder 9.

The brackets 15 are mounted on the ends of bolts 18, being secured thereto by nuts 19 and 20. Threaded sleeves 21 are loosely mounted on the bolts 18 and carry nuts 22 which are adjustable to permit clamping of any suitable support such as a bracket 23. The threaded sleeves 21 are provided with flanges 24, and springs 25 are disposed between the flanges 24 and washers 26 adjacent the nuts 20. Thus, when the sleeve 21 is held fixedly on the bracket 23, the roller 9 and its supporting structure is held resiliently against the part which it engages under tension of the springs 25. This arrangement ensures continuous contact of the roller 9 with the belt and avoids the formation of gaps which might result in sparking.

One of the bolts 18 at its lower end is provided with a ground clamp 27 which is secured by a nut 28. The ground clamp includes a nut 29 adapted to grip the end of a ground cable 30 which extends through openings 31 provided therefor. The eliminator is thus grounded and static is removed continuously from the traveling belt. This effectually avoids the building of sparking charges on the belt and completely eliminates the possibility of sparking.

As will be readily understood, the details of the structure are not essential, although the device as described is simple and effective and has been used successfully in the elimination of static charges in industrial plants where the possibility of sparking must be eliminated to avoid the chance of serious explosion.

Various changes may be made in the details of structure without departing from the invention or sacrificing the advantages thereof.

I claim:

1. A static eliminator for power-transmission belts comprising a fixed support, a pair of sleeves extending through said support and adjustable longitudinally with respect thereto, a bolt extending loosely through each of said sleeves, brackets on one end of the bolts, means for adjusting the position of said brackets with respect to the bolts, a roller adapted to engage a belt, means rotatively mounting said roller in said brackets, springs surrounding the belts and extending between the brackets and the support for resiliently urging the ends of the bolts carrying the brackets away from the support, means on the opposite ends of the bolts for limiting their movement away from the support, and a ground-cable-engaging means carried by one of said bolts, the roller, the bolt carrying the ground-cableengaging means and the bracket carried by said bolt being of electrically-conductive material and forming a conductive path for static electricity from the roller to the ground-cable-engaging means.

2. A static eliminator for power-transmission belts comprising a fixed support, a pair of sleeves extending through said support and adjustable longitudinally with respect thereto, a bolt extending loosely through each of said sleeves, brackets on one end of the bolts, means for adjusting the position of said brackets with respect to the bolts, a roller adapted to engage a belt, means rotatively mounting said roller in said brackets, springs surrounding the bolts and extending between the brackets and the support for resiliently urging the ends of the bolts carrying the brackets away from the support, means on the opposite ends of the bolts for limiting their movement away from the support, and a ground-cable-engaging means carried by the end of one of said bolts remote from that to which the bracket is secured, the roller, the bolt carrying the ground-cable-engaging means and the bracket carried by said bolt being of electrically-conductive material and forming a conductive path for static electricity from the roller to the ground-cable-engaging means.

CHARLES J. KILDUFF.